J. J. MERRILL.
APPARATUS FOR MANUFACTURING DEXTRIN.
APPLICATION FILED NOV. 2, 1917.

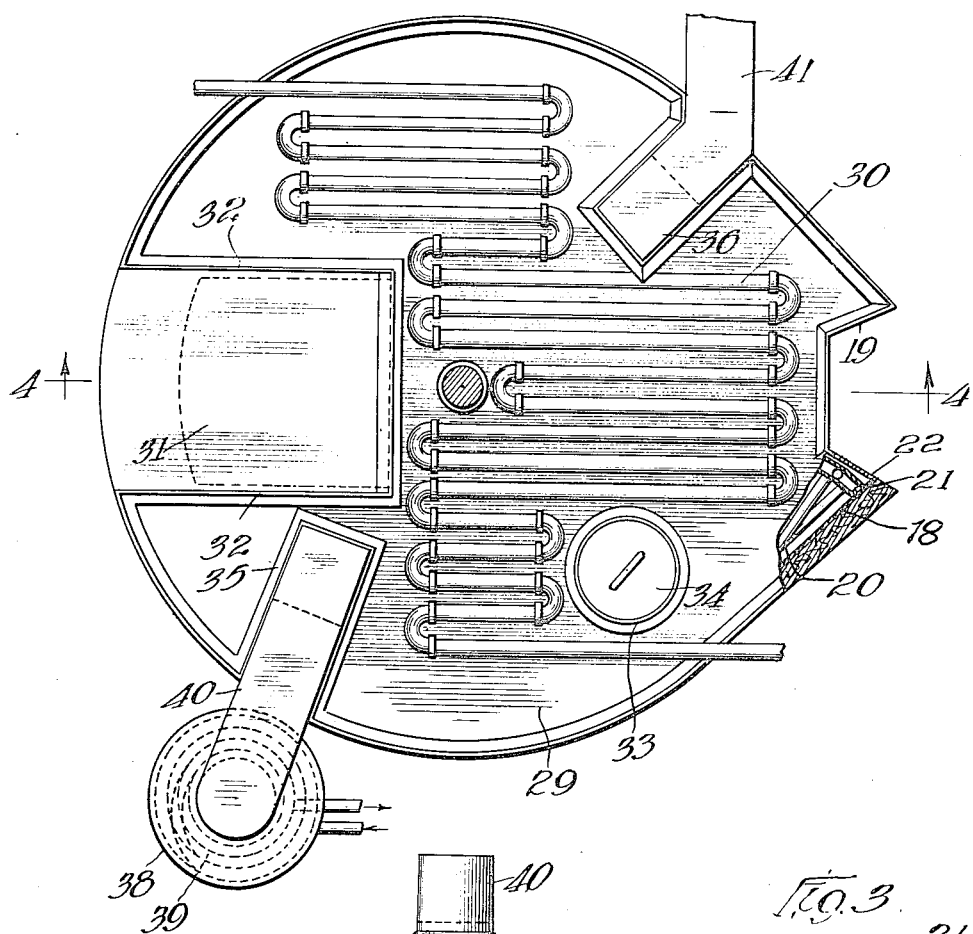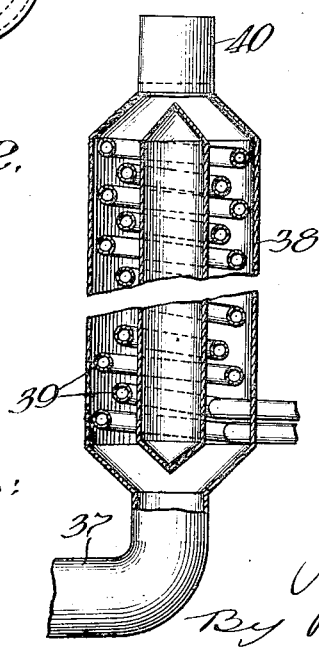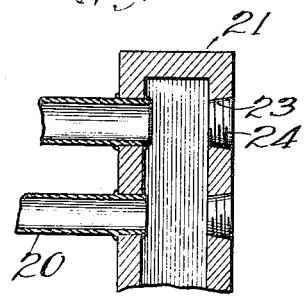

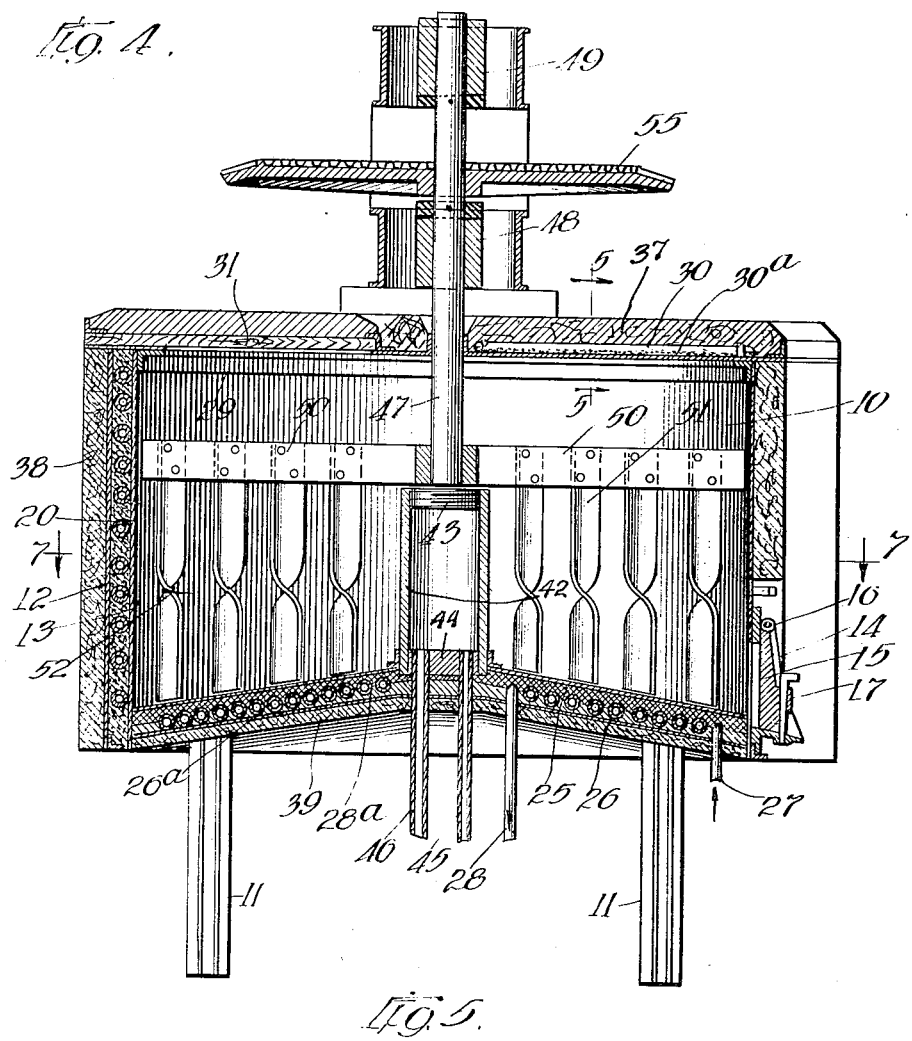

UNITED STATES PATENT OFFICE.

JOSEPH J. MERRILL, OF CHICAGO, ILLINOIS, ASSIGNOR TO CORN PRODUCTS REFINING COMPANY, A CORPORATION OF NEW JERSEY.

APPARATUS FOR MANUFACTURING DEXTRIN.

1,425,497. Specification of Letters Patent. Patented Aug. 8, 1922.

Application filed November 2, 1917. Serial No. 199,867.

*To all whom it may concern:*

Be it known that I, JOSEPH J. MERRILL, a citizen of the United States, residing at Chicago, in the county of Cook and State of Illinois, have invented certain new and useful Improvements in Apparatus for Manufacturing Dextrin, of which the following is a specification.

My invention relates to the manufacture of dextrin and allied products, and has for its primary object to provide an improved form of apparatus for accomplishing the dextrinization of starch by means of which a purer, more homogeneous and if desired, a whiter product may be obtained than has been possible with other known forms of apparatus, where, in particular, the manufacture is to be carried on in relatively large batches.

A further object of the invention is to provide an improved form of apparatus of economical construction which will permit the heat to be applied to the material being treated at a higher temperature than is customary whereby the manufacture of the product is carried on more rapidly and economically.

Dextrin is manufactured by roasting or heating starch which is usually acidulated, the material being in agitation during the process so as to prevent caking or gelatinizing of any portion thereof to the detriment of the product. If a uniform product is to be obtained, it is essential that the heat be applied equally to the entire batch under treatment. The starch when introduced into the dextrinizing vessel contains ordinarily some water—commercial starch has ordinarily a moisture content of about 7% to 13% by weight—besides which there is the nitric, hydrochloric or other acid with which the starch is acidulated. This moisture is vaporized by the roasting or heating operation, and there is a tendency always for the vapors to condense, particularly against the top wall of the vessel. If this takes place, the drops of water of condensation falling back into the material form gelatinized, or partially gelatinized lumps, with the result that the product is not homogeneously dextrinized throughout.

It is one of the objects of my invention to provide an apparatus in which suitable means are provided for thoroughly agitating the material being treated, and in which the condensation of the vapors developed during the process is prevented.

During the dextrinizing process the starch becomes very dry and inflammable, and is likely to be ignited under such condition by sparks caused by the striking of one metal part against another. With the view of overcoming this undesirable result, the invention has as one of its objects to provide an apparatus in which sparks due to one metal part striking another are prevented. The invention consists of the novel arrangements, constructions and combination of parts, hereinafter described and claimed, for carrying out the above stated objects, and such other objects as may appear from the following description.

The invention is illustrated in certain preferred embodiments in the accompanying drawings, wherein like characters of reference designate like parts, and wherein:

Fig. 1 is a plan view of my preferred form of apparatus, illustrating the manner in which the heating coils are applied to the top of the dextrinizing vessel;

Fig. 2 is a vertical sectional view of an air heating element employed in connection with the apparatus shown in Fig. 1;

Fig. 3 is a fragmentary sectional view illustrating the manner in which the side wall heating pipes are connected with the headers through which the pipes are supplied with steam;

Fig. 4 is a vertical sectional view taken on the line 4—4 of Fig. 1;

Fig. 5 is a fragmentary section taken on the line 5—5 of Fig. 4, illustrating the position of the heat-conducting material applied between the heating pipes and the top plate of the dextrinizing vessel;

Figure 6:
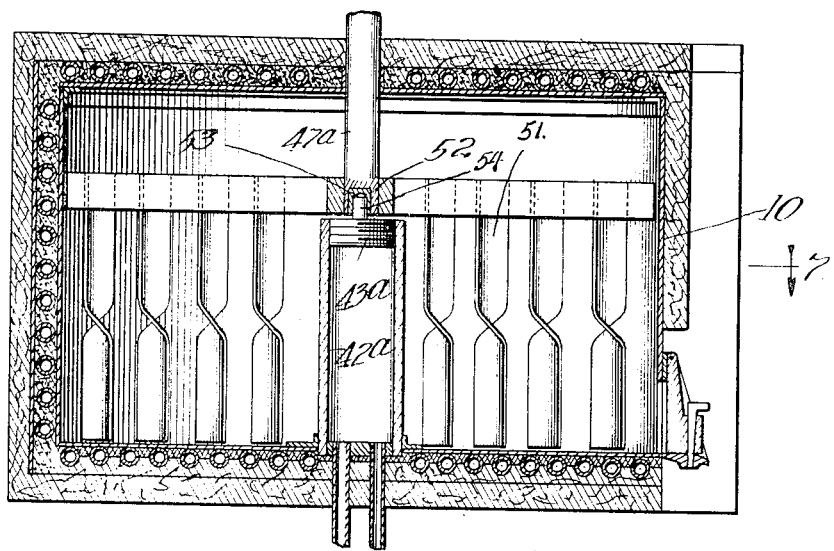
Fig. 6 is a view similar to Fig. 4, illustrating a modification.

With reference to Figs. 1 to 5 of the drawings, 10 designates a dextrinizing vessel constructed of sheet metal plates secured together and reinforced by angle bars, and supported in suitable supports 11. The side walls of the vessel consist preferably of an outer sheet 12 and an inner sheet 13, the latter being formed with a door opening 14 adapted to be closed by a door 15 hinged to a door-frame casting 16 and adapted to be latched to said frame casting by a latch bolt 17. The ends 18 of the outer sheet 12 of the side wall are straight for a certain distance, and terminate at and are secured to upright plates 19 at opposite sides of the door. The inner and outer side wall sheets 12 and 13 are spaced apart to make room for steam pipes 20, which are headed into or otherwise secured in a suitable manner in vertically placed headers 21 arranged in the enlarged space 22 between the extremities 18 of the outer sheet and the inner sheet. The steam pipes have straight ends in a staggered arrangement to give sufficient room for heading over the pipes, and the headers are so formed that the pipes extend at right angles to the portions of the headers to which they are united. To permit the upsetting of the pipes, the headers are formed with openings 23 which are subsequently closed by screw plugs 24 (Fig. 3). The space within the side wall of the vessel in which the steam pipes 20 are located is filled preferably with some heat-conducting material, for example, iron filings; this material serving to bring the heat of the steam in the pipes to the inner sheet 13 of the wall by direct conduction. This construction is much cheaper than a steam jacket, and is equally as efficient. It permits high pressure steam to be used with safety, and makes the process rapid.

The bottom sheet 25 of the vessel preferably slopes from a central point down toward the side wall and is secured to the lower edge of the inner sheet 13 of the side wall in any suitable manner. The purpose of forming the bottom with a downward slope is to provide for a quick discharge of the product as the conversion continues as long as it remains in the vessel. The bottom of the dextrinizing vessel is heated by means of the steam coils 26, having an inlet 27 and an outlet at 28. These coils may be supported in any suitable manner, as for example, by means of the slats 26ᵃ. For the purpose of conducting the heat from these coils to the bottom sheet of the dextrinizing vessel, I preferably employ a body of lead 28ᵃ which is interposed between the heating coil and the bottom sheet 25. On the top cover 29 of the vessel is a steam coil 30 arranged so as to cover as much of the top of the vessel as possible. In this construction the top of the vessel is formed with a man-hole which is covered by a gate 31, made preferably of wood, so as to minimize condensation. This gate is slidably arranged in guides 32. 33 is a starch inlet provided with a suitable cover 34, and 35, 36 are openings through which the heated air is introduced into the vessel in the manner hereinafter described. The coil 30 is arranged to cover practically all of the top of the vessel except these several openings. The purpose of this coil is to keep the top wall of the vessel warm, so that the vapors within the vessel will not condense thereon. Preferably a body 30ᵃ of heat conducting material, such, for example, as iron filings, is placed on the plate 29, so as to embed, or partially embed the heating coils. Over this is preferably a layer of heat insulating material 37, arranged above the coil. Similarly the side and bottom walls are covered with bodies of insulation 38 and 39.

As a further means of preventing condensation of the vapors developed by the heating of the starch, I preferably provide apparatus with means for producing a draft of superheated air through the upper part of the vessel above the material. This expedient might be used instead of the heating of the top plate, but preferably both expedients are employed. This air is withdrawn therefrom by any suitable exhausting apparatus (not shown) through the opening 36. The in-going air passes through the pipe 37 into a heater 38 in which is arranged a steam coil 39. From the heater a pipe 40 leads to opening 35. 41 is a pipe leading from opening 36 to the exhausting apparatus. The air being highly heated when introduced into the dextrinizing vessel, will absorb a considerable amount of moisture which is carried out of the vessel in the form of steam or vapor. This air circulatory system also serves to dispose of the acid fumes, which are more or less noxious. For the purpose of applying heat to the quantity of material near the center of the vessel, I preferably provide a centrally arranged pipe 42 which projects upwardly through the bottom of the vessel. This pipe is closed at the upper end with a plug 43 and preferably extends above the batch of the material being treated. The lower end of the pipe is closed with a plug 44 into which are fitted steam supply and discharge pipes 45 and 46, respectively.

The arrangement of the heating coils above described permits the roasting or heating operation to be performed with high pressure steam without the necessity of providing the more or less expensive structure which would be necessary to reinforce the side wall if a jacketed dextrinizing vessel were used. In manufacturing certain grades of dextrin the starch contains a large percentage of moisture, and under such conditions the heat is ordinarily applied gradually, so as to prevent starch from being gelatinized or caked. For the purpose of permitting the application of a relatively high temperature to the starch under such conditions, and thereby reducing the time necessary to treat the material, I preferably provide the dextrinizing vessel with an agitating device which produces a movement or turning over of the material in such a manner as will prevent the heat from being applied to one part of the batch more than another. This agitating mechanism preferably consists of a vertically arranged shaft 47, which extends through the cover sheet 29 of the vessel, and is supported on the outside thereof in bearings 48, 49. The lower end of the shaft is provided with laterally extending arms 50, to which are secured vertically disposed agitating blades 51. These agitating blades are preferably, though not necessarily, made of wood or other suitable material to which the damp starch will not cling in a manner to form cakes or lumps. The blades 51 are preferably formed with a twist near their center, so that the lower portions of the blades tend to force the material in one direction, while the upper portion of the blades tend to move the material backwardly in the other direction. The arrangement therefore produces what might be termed a circulation of the material from the center of the vessel outwardly and back again toward the center. The agitator, except for blades 51, lies entirely above the material in the chamber, so that the starch does not come into contact with any cold metal. It is for this reason, and because the heat is applied to the center of the mass as well as its periphery, that it is possible to use a high temperature even with relatively moist starch. If, as is preferred, the agitating blades are made of wood, so that they will not cause a spark by coming in contact with the metal bottom of the vessel, their lower ends may be formed to correspond with the slope of the bottom sheet and may be arranged very close to the same so as to keep the material adjacent the bottom sheet 25 thoroughly agitated, and thus prevent such material from being overheated.

Figure 7:
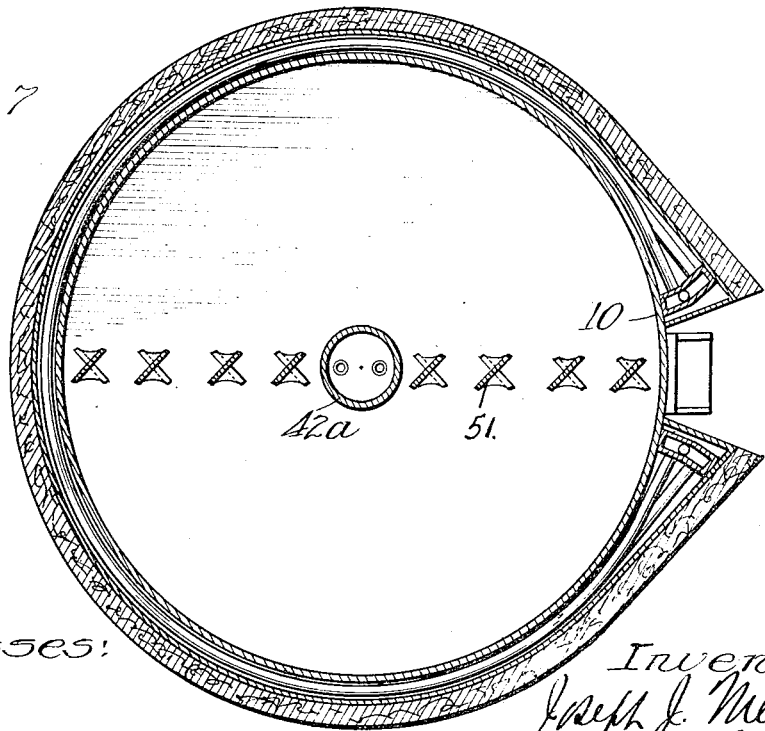
Fig. 7 is a sectional plan taken through either of the apparatuses illustrated in Figs. 4 and 6, on the line 7—7.

In Figs. 6 and 7 I have shown a modified construction which in many respects is constructed the same as the apparatus previously described.

These common features are indicated on the drawings by the same reference characters as are employed in connection with the construction shown in the preceding figures. The principal difference in this modification from that illustrated in Figs. 1 to 5 is that the bottom sheet 25ª is flat instead of sloping toward the side wall, and the agitating member is supported within the dextrinizing vessel. In this construction the vertical shaft 47ª is formed at the lower end with a pocket 52 in which is arranged a bearing 53 which fits over a stud 54 formed on the plug 43ª, closing the upper end of the pipe 42ª. The bearing 53 is preferably made of phosphor bronze or some other suitable material which will not cause a spark when it is struck or scraped by another metal part of the apparatus. The agitator may be rotated in this construction substantially in the same manner as indicated at 55 in Fig. 4.

Operation: A batch of starch, after having been acidulated, is run into the dextrinizing vessel through the starch inlet 33. The agitator is set in motion, and steam turned into the steam coils. As the vapors are developed through the heating of the starch, they are carried out of the vessel by the draft of superheated air which enters through the pipe 40 and is discharged through the pipe 41 at the opposite side of the dextrinizing vessel. The side walls and top wall of the vessel are heated, so that there is no possibility of any condensation of vapors accumulating on these walls. As a result of this arrangement, it has been found possible to turn out a very high grade of dextrin, even when the product is manufactured in large batches. The material under treatment is kept in constant agitation by the blades 51, so that gelatinizing or overheating of any portion of the batch is prevented.

The apparatus above described is suitable for use in the manufacture either of the products known commercially as dextrins, or of kindred products such as British gum and the like; and the term "dextrin" as employed in the claims is intended to cover such related products as well as dextrins strictly speaking.

This application is a continuation in part of my co-pending application Serial No. 163,945, filed April 23, 1917 and the features of invention common to the two applications are claimed in said application 163,945 and not herein.

I claim:

1. In apparatus for the manufacture of dextrin, the combination of a dextrinizing vessel and a rotary agitator therein provided with a plurality of blades, the upper and lower end portions of each blade standing at an angle to each other and the corresponding end portions of the blades being substantially parallel one with another, whereby one set of end portions acts upon the material positively and moves the same in one direction and the other set acts upon the material positively and moves the same in the opposite direction.

2. In apparatus for the manufacture of dextrin, the combination of a dextrinizing vessel substantially circular in horizontal section and an agitator therein rotating on a vertical axis and provided with a diametrically arranged member having a plurality of agitating blades, the lower end portions of which stand at an angle to their upper end portions, respectively, with the upper ends in substantial parallelism one with another and the lower ends correspondingly arranged with respect to each other, for the purpose described.

3. In apparatus for the manufacture of dextrin, the combination of a dextrinizing vessel substantially circular in horizontal section, a centrally arranged heating element projecting up from the bottom of the vessel, and a rotary agitator having blades extending into the annular space around the heating element which blades are formed so that their upper ends act upon the material and move the same in one direction while the lower ends of the blades act upon the material and move the same positively in the other direction.

4. In apparatus for the manufacture of dextrin, the combination of a dextrinizing vessel substantially circular in horizontal section, a centrally arranged heating element projecting up from the bottom of the vessel, a rotary agitator having blades extending into the annular space around the heating element which blades are formed so that their upper ends act upon the material and move the same in one direction while the lower ends of the blades act upon the material and move the same positively in the other direction, and means for heating the side, bottom and top walls of the vessel.

5. In apparatus for the manufacture of dextrin, the combination of a dextrinizing vessel substantially circular in horizontal section, a centrally arranged heating element projecting up from the bottom of the vessel, a rotary agitator having blades extending into the annular space around the heating element, which blades are formed so that their upper ends act upon the material and move the same positively in one direction while the lower ends of the blades act upon the material and move the same positively in the other direction, means for heating the side, bottom and top walls of the vessel, and means for causing a circulation of heated air to pass through the upper part of the chamber.

6. In apparatus for manufacturing dextrin, the combination of a dextrinizing vessel circular in horizontal section, the bottom of which is in the form of an upwardly projecting cone, a centrally arranged heating element projecting up from the bottom of the vessel, and a rotary agitator having blades extending into the annular space around the heating element, which blades are formed so that their upper ends act upon the material and move the same positively in one direction while the lower ends of the blades act upon the material and move the same positively in the other direction.

7. In apparatus for the manufacture of dextrin, the combination of a dextrinizing vessel circular in horizontal section, heating means arranged in the walls of said vessel, a centrally arranged heating element projecting upwardly from the bottom of the chamber, and means operating in the annular space around the heating element for acting positively on both the upper and lower portions of the body of material treated to move the upper portion in one direction between the heating element and side wall and the lower portion in the opposite direction.

8. In apparatus for the manufacture of dextrin, the combination of a substantially cylindrical dextrinizing vessel, steam heating coils arranged in the top, bottom and side walls of said vessel, a centrally arranged steam chamber projecting upwardly from the bottom of the vessel and provided with intake and discharge pipes, a shaft extending centrally through the top of the vessel provided with a transverse member, a plurality of agitating blades depending from said transverse member, the upper end portions of the blades standing at an angle to the lower end portions, and means for rotating said shaft.

9. In apparatus for making dextrin, the combination with a closed dextrinizing vessel adapted to contain a batch of material to be treated and formed with a bottom which slopes downward toward the side walls of said vessel, of a centrally arranged vertically extending pipe to conduct heat to the interior of said batch, and agitating means comprising a vertically extending shaft having lateral arms and vertical blades secured at their upper ends to said arms and having their lower ends formed to correspond to the slope of said bottom.

JOSEPH J. MERRILL.